UNITED STATES PATENT OFFICE.

KARL JOSEPH BAYER, OF ELABUGA, RUSSIA.

PROCESS OF MAKING ALUMINA.

SPECIFICATION forming part of Letters Patent No. 515,895, dated March 6, 1894.

Application filed October 3, 1892. Serial No. 447,691. (No specimens.)

*To all whom it may concern:*

Be it known that I, KARL JOSEPH BAYER, a subject of the Emperor of Austria-Hungary, residing at Elabuga, in the government of Wiatka and Empire of Russia, have invented certain new and useful Improvements in Processes of Obtaining Alumina; and I do declare the following to be a full, clear, and exact description of the invention.

In the Letters Patent No. 382,505, granted to me heretofore under date of May 8, 1888, for a process of obtaining alumina, aluminate-lyes were decomposed by the action of hydrate of alumina and thereby alumina-lyes obtained in which the proportion of the molecules of alumina ($Al_2O_3$) and that of soda ($Na_2O$) was one to six. These lyes were concentrated, mixed with bauxite and subjected to the heat of suitable calcining-furnaces for the purpose of obtaining crude aluminate, which is then dissolved in water, filtered and then again subjected to decomposition.

A number of experiments have shown that in many cases the decomposed and concentrated aluminate-lyes act in the nature of caustic soda. I found that when the decomposed lyes are concentrated to a density of from 40 to 44° Baumé, they will dissolve the alumina directly from the bauxite, provided that said lyes are subjected with the same to continuous agitation at a pressure of from three to four atmospheres, from one and one-half to two hours, at a temperature of from 160° to 170° centigrade. The bauxite is finely pulverized, and if only a small quantity of silicic acid is present in the same, the alumina will be dissolved to such an extent that only traces of the same remain, that is to say, up to a small quantity, which forms with the dissolved silicic acid and a corresponding quantity of soda the well known double salt $Na_2O Al_2O_3, 3SiO_2 9$ aq.

In the ordinary red French bauxite, which is usually used in the manufacture of alumina and which contains about sixty-one per centum of alumina ($Al_2O_3$) and about three per centum of silicic acid ($SiO_2$), fifty-nine per centum of the alumina are obtained in solution when the aluminate-lye and the bauxite are mixed in such a proportion that after the reaction the molecular proportion of the resulting solution is as follows:— $Al_2O_3 : Na_2O = 1 : 1.75$ or $1 : 1.85$, which corresponds to a yield of at least ninety-six per centum of the alumina contained in the raw material. The apparatus that is used for this purpose consists of a cylindrical boiler that is made of boiler iron one-half inch in thickness, which boiler is provided with the usual accessories, such as a safety-valve, an agitating-device, a pressure-gage, a pressure-pipe and filling-opening. As will be readily apparent, the boiler can be made comparatively small in dimensions, which fact precludes any danger in the use of the same. At the same time, the consumption of fuel and the labor required for charging the apparatus are comparatively small and insignificant.

In a boiler of eight feet length and three feet in diameter can be treated from eight thousand to ten thousand pounds of bauxite per day, and the consumption of fuel and labor required is hardly one-fifteenth of the expense connected with that required for the corresponding number of calcining-furnaces heretofore in use, aside from the fact that by my present process the alumina is obtained in solution, while by my prior process the dry, crude aluminate as it comes from the calcining-furnace has to be dissolved for use. The red residue which remains in the boiler after treatment of the bauxite and which contains iron, forms a sediment at the bottom of the boiler and can be readily subjected to filtration and washing. As the residue contains a high percentage of iron and a comparatively small percentage of alumina, it can be worked up as a bye-product, or it can be mixed with iron ore and utilized in the production of pig-iron.

Having thus described my invention, what I claim as new, and desire to secure by Letters Patent, is—

The process herein described of producing alumina from bauxite, which consists in subjecting an aluminate-lye under constant stirring and at ordinary temperature to the action of hydrate of alumina so as to decompose said solution and precipitate hydrate of alumina, filtering off the precipitate, concentrating the remaining aluminate-lye, mixing the resulting liquor with finely-pulverized bauxite, and finally subjecting the mixture under continuous agitation to heat and pressure, substantially as set forth.

In testimony whereof I affix my signature in presence of two witnesses.

KARL JOSEPH BAYER.

Witnesses:
S. SHISHKOFF,
M. HAUFFE.